United States Patent
Hiraoka et al.

(10) Patent No.: US 12,183,513 B2
(45) Date of Patent: Dec. 31, 2024

(54) DIELECTRIC DEVICE

(71) Applicant: TDK CORPORATION, Tokyo (JP)

(72) Inventors: Masahiro Hiraoka, Tokyo (JP);
Hitoshi Saita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 166 days.

(21) Appl. No.: 18/080,962

(22) Filed: Dec. 14, 2022

(65) Prior Publication Data

US 2023/0420186 A1  Dec. 28, 2023

(30) Foreign Application Priority Data

Mar. 30, 2022  (JP) ................ 2022-056772

(51) Int. Cl.
 *H01G 4/12* (2006.01)
 *H01G 4/33* (2006.01)

(52) U.S. Cl.
 CPC ............ *H01G 4/1227* (2013.01); *H01G 4/33* (2013.01)

(58) Field of Classification Search
 None
 See application file for complete search history.

(56) References Cited

FOREIGN PATENT DOCUMENTS

| JP | 2010-212346 A | 9/2010 |
| JP | 2018174304 A * | 11/2018 ......... C01B 21/0821 |

* cited by examiner

*Primary Examiner* — Eric W Thomas
(74) *Attorney, Agent, or Firm* — Oliff PLC

(57) ABSTRACT

A dielectric device includes a first electrode, dielectric film, and second electrode, which are laminated. The dielectric film includes columnar crystals extending in a lamination direction. Provided that "x" denotes a reciprocal (1/μm) of a dielectric film thickness and "y" denotes a dielectric material average crystallite size (nm) calculated by the Scherrer equation, "x" and "y" are located within a quadrilateral having point A (0.10, 5), point B (10, 20), point C (10, 35), and point D (0.10, 10) as vertices. Alternatively, the columnar crystals have an average width of less than 40 nm within a distance range from one tenth to one third of the dielectric film thickness from one electrode to the other and an average width of 40 nm or more within a distance range from one tenth to one third of the dielectric film thickness from the other electrode to the one in the lamination direction.

7 Claims, 4 Drawing Sheets

First electrode side

Second electrode side

DIELECTRIC DEVICE

TECHNICAL FIELD

The present application claims a priority on the basis of Japanese patent application No. 2022-056772 filed on Mar. 30, 2022, which is incorporated herein by reference in its entirety.

The present invention relates to a dielectric device. In particular, the invention relates to a dielectric device such as a thin film capacitor including a thin dielectric film.

BACKGROUND

In recent years, electronic circuits have been increasingly densified and integrated along with smaller size and higher performance of electronic equipment. For dielectric devices plentifully mounted on such electronic circuits, higher performance and smaller size are in demand. For a thin film capacitor as an example of the dielectric devices, larger capacitance is in demand.

One known method for enabling larger capacitance of the thin film capacitor is a method of generating columnar crystals as crystals of the dielectric.

JP Patent Application Laid Open No. 2010-212346 discloses a dielectric device including a dielectric film. In the dielectric film, dielectric layers including columnar crystals are laminated in a direction perpendicular to a substrate surface. The columnar crystals in the dielectric layers adjacent to each other are not continuous at lamination boundaries. JP Patent Application Laid Open No. 2010-212346 states that such a dielectric device enables improvement of leak characteristics and larger capacitance.

SUMMARY

A certain DC voltage (DC bias voltage) is applied to electronic components (e.g., an integrated circuit (IC)) mounted on the electronic circuits for the electronic components to operate appropriately. The same DC bias voltage is thus applied to the dielectric devices (e.g., the thin film capacitor) mounted on the electronic circuits.

Application of the DC bias voltage may change the capacitance of the dielectric devices, due to the composition, structure, and the like of dielectric materials of the dielectric devices. In particular, the larger the DC bias voltage, the larger the reduction of the capacitance, which tends to inhibit expected performance of the dielectric devices. Thus, a small rate of change of capacitance at the time of application of the DC bias voltage is in demand for the dielectric devices.

Unfortunately, the dielectric device disclosed in JP Patent Application Laid Open No. 2010-212346 has high DC bias dependence of capacitance and a large rate of change of capacitance at the time of application of the DC bias voltage.

The present invention has been achieved under such circumstances. It is an object of the invention to provide a dielectric device including a dielectric film having a small rate of change of capacitance at the time of application of a DC bias voltage.

To achieve the above object, the present invention is as follows.

[1] A dielectric device including a first electrode, a dielectric film, and a second electrode, wherein
the first electrode, the dielectric film, and the second electrode are laminated;
the dielectric film includes columnar crystals extending in a direction of lamination; and
"x" and "y" are located on straight lines connecting point A (0.10, 5), point B (10, 20), point C (10, 35), and point D (0.10, 10) in this order and within a region boxed by the straight lines on an (x, y) plane, provided that "x" denotes a reciprocal (1/μm) of a thickness of the dielectric film and "y" denotes an average crystallite size (nm) of a dielectric material of the dielectric film calculated by the Scherrer equation.

[2] A dielectric device including a first electrode, a dielectric film, and a second electrode, wherein
the first electrode, the dielectric film, and the second electrode are laminated;
the dielectric film includes columnar crystals extending in a direction of lamination; and
the columnar crystals have an average width of less than 40 nm within a distance range from one tenth to one third (both inclusive) of a thickness of the dielectric film from one electrode to the other electrode of the first and second electrodes in the direction of lamination, and an average width of 40 nm or more within a distance range from one tenth to one third (both inclusive) of the thickness of the dielectric film from the other electrode to the one electrode in the direction of lamination.

[3] The dielectric device according to [2], wherein the dielectric film has a thickness of 0.1 μm or more and 10 μm or less.

[4] The dielectric device according to any one of [1] to [3], wherein
the dielectric film includes a complex oxide having a perovskite structure represented by a chemical formula $ABO_3$;
"A" in the chemical formula includes at least one selected from the group consisting of barium, calcium, strontium, and lead; and
"B" in the chemical formula includes at least one selected from the group consisting of titanium, zirconium, tin, and hafnium.

[5] The dielectric device according to any one of [1] to [4], wherein
the dielectric film includes a pore region containing a fine pore between the columnar crystals and at least one of the first electrode and the second electrode.

The present invention can provide the dielectric device including the dielectric film having a small rate of change of capacitance at the time of application of the DC bias voltage.

BRIEF DESCRIPTION OF THE DRAWING(S)

DETAILED DESCRIPTION

Hereinafter, the present invention will be explained in detail based on a specific exemplary embodiment in the following order using the drawings.

1. Thin Film Capacitor
1.1 Overall Structure of Thin Film Capacitor
1.2 Dielectric Film
1.3 First Electrode
1.4 Second Electrode
2. Method of Manufacturing Thin Film Capacitor 1. Thin Film Capacitor First, a thin film capacitor including a dielectric thin film will be explained as a dielectric device according to the present embodiment.

1.1 Overall Structure of Thin Film Capacitor

Figure 1:
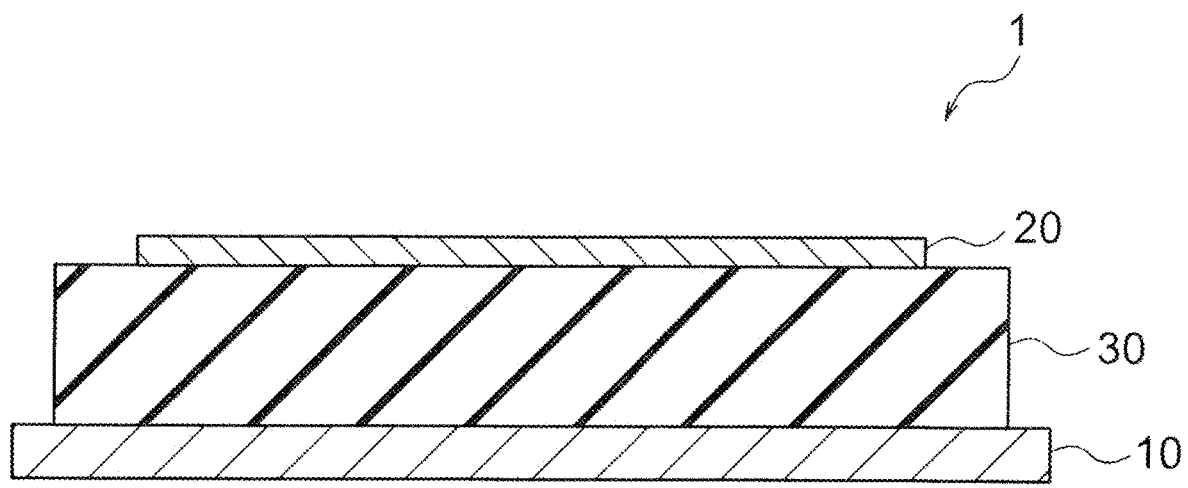
FIG. 1 is a schematic view of a cross section of a thin film capacitor as a dielectric device according to an embodiment of the present invention.

As shown in FIG. 1, a thin film capacitor 1 as an example of the dielectric device according to the present embodiment includes a first electrode 10, a dielectric film 30, and a second electrode 20 laminated in this order.

When a voltage is applied to an external circuit connected to the first electrode 10 and the second electrode 20, the dielectric film 30 exhibits predetermined capacitance. This enables the thin film capacitor 1 to function as a capacitor. Details of each constituent will be explained later. For clarification of the vertical direction of the thin film capacitor, one electrode may be defined as an upper electrode, and the other electrode may be defined as a lower electrode. For example, in FIG. 1, the first electrode 10 is the lower electrode, and the second electrode 20 is the upper electrode.

The thin film capacitor may have any shape, normally a rectangular parallelepiped shape. The thin film capacitor may have any size and has an appropriate thickness and length based on usage.

1.2 Dielectric Film

In the present embodiment, the dielectric film is a thin film formed by a known film formation method. Because such a thin film is normally formed from atoms deposited on a substrate, the dielectric film is preferably a dielectric deposition film. Thus, the dielectric film according to the present embodiment does not include a sintered body produced by firing a pressed body formed from a pressed dielectric raw material powder (produced by solid-phase reaction).

Figure 2:
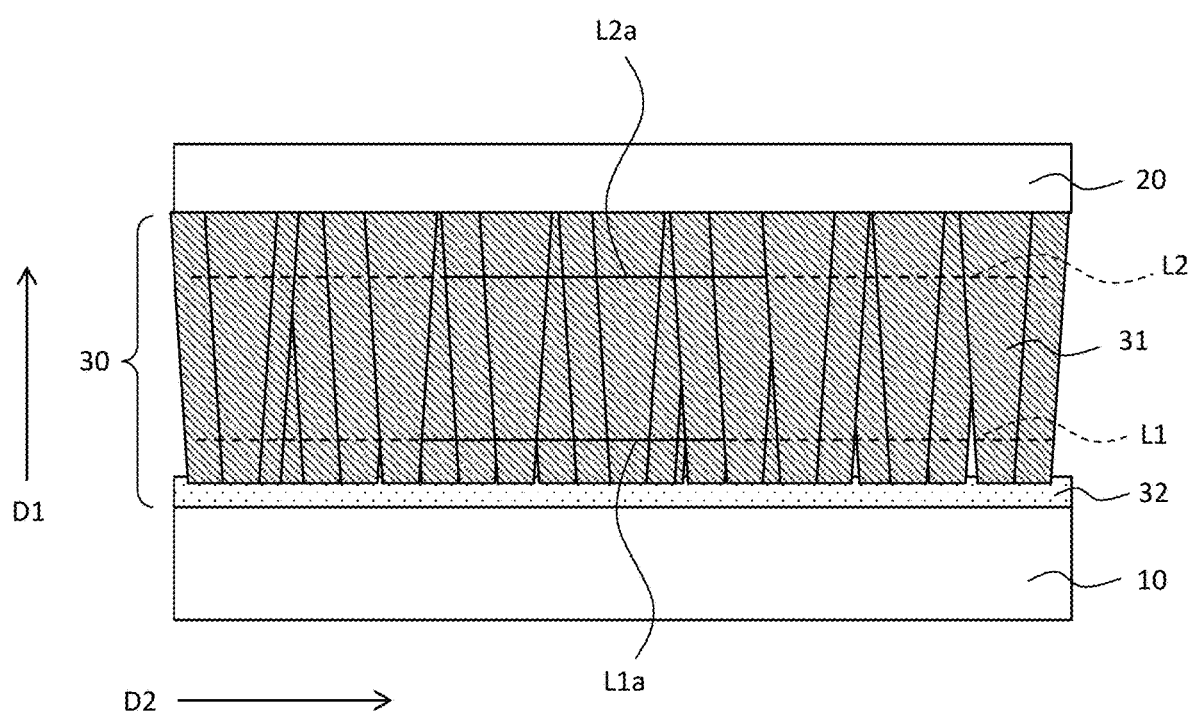
FIG. 2 is a schematic view of a cross section of the thin film capacitor for explaining columnar crystals included in a dielectric film.

In the present embodiment, the dielectric film includes columnar crystals. As shown in FIG. 2, in the structure in which the first electrode 10, the dielectric film 30, and the second electrode 20 are laminated, columnar crystals 31 extend along a lamination direction D1. That is, the columnar crystals 31 are crystallites having a longer length along the lamination direction D1 than a length along a direction D2 orthogonal to the lamination direction D1. The aspect ratio of the columnar crystals 31 depends on the thickness of the dielectric film 30 and is, for example, 2 or more. The columnar crystals 31 are not required to be perpendicular to the first electrode 10 and the second electrode 20 and may be tilted by, for example, about ±5°.

Including the columnar crystals 31 in the dielectric film 30 enables the dielectric device to have increased capacitance. In the present embodiment, the columnar crystals 31 preferably occupy 50% or more of the dielectric film 30 and more preferably occupy 90% or more of the dielectric film 30. The proportion of the columnar crystals 31 can be calculated as, for example, the proportion of the area of the columnar crystals in a cross section of the dielectric film along the lamination direction of the dielectric device.

As described above, application of a DC bias voltage may change the capacitance of the dielectric device. This is because the dielectric material of the dielectric film includes a spontaneously polarized ferroelectric material.

When a DC bias voltage is applied to the dielectric device, directions of spontaneous polarization start to be aligned in accordance with the intensity of the DC electric field. As the DC bias voltage increases (as the intensity of the DC electric field increases), polarization saturates and spontaneous polarization is restricted. Under such a state, spontaneous polarization reversal is difficult to occur even when an AC voltage as a signal is applied to the electronic circuit. Thus, the capacitance is reduced.

As the capacitance is reduced significantly, the effective capacitance of the dielectric device when in use is reduced from the standard capacitance value of the dielectric device.

To prevent such reduction of the effective capacitance, the focus of the present embodiment is on the thickness of the dielectric film and the crystallite size of the dielectric material (particularly, the columnar crystals) of the dielectric film, which are controlled within predetermined ranges.

Figure 3:
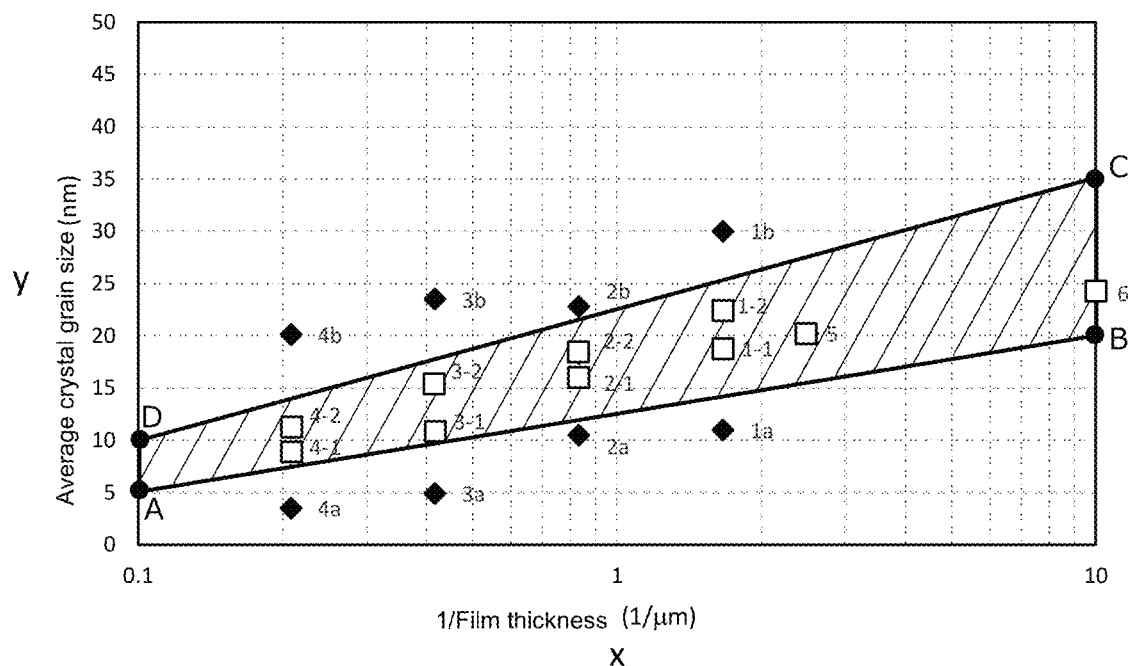
FIG. 3 is a graph showing a relation between the average crystallite size of the dielectric material included in the dielectric film and the reciprocal of the thickness of the dielectric film.

Provided that "x" denotes the reciprocal (1/μm) of the thickness of the dielectric film and "y" denotes the average crystallite size (nm) of the dielectric material, in the present embodiment, "x" and "y" are located on straight lines of a quadrilateral having point A (0.10, 5), point B (10, 20), point C (10, 35), and point D (0.10, 10) shown in FIG. 3 as vertices and within a region (a hatched region in FIG. 3) boxed by the straight lines on an (x, y) plane.

Controlling "x" and "y" within the region shown in FIG. 3 can reduce the rate of change of capacitance at the time of application of the DC bias voltage.

Because the intensity of the electric field applied to the dielectric per unit thickness differs depending on the thickness of the dielectric film even when the same amount of DC bias voltage is applied, the rate of change of capacitance is affected by the thickness of the dielectric film. Thus, the thickness of the dielectric film is controlled within the above-mentioned range.

It is assumed that the average crystallite size corresponds to the size of regions (domains) where spontaneous polarization is generated. The larger the average crystallite size, the larger the domains and the capacitance, and unfortunately the larger the effect of the DC bias voltage (the higher the DC bias dependence). Thus, the average crystallite size is controlled within the above-mentioned range.

In the present embodiment, the average crystallite size D (nm) of the dielectric material is calculated by the Scherrer equation shown below based on XRD measurement.

$$D = K\lambda / B \cos\theta$$

In the equation, K is the Scherrer constant, $\lambda$ is the wavelength (nm) of the X-ray, B is full width at half maximum (FWHM) of a diffraction peak, and $\theta$ is the Bragg angle (rad). FWHM of a diffraction peak is calculated by fitting of a predetermined diffraction peak using a known fitting function.

In the present embodiment, the thickness of the dielectric film is preferably 0.1 μm or more, and more preferably 0.2 μm or more. At the same time, the thickness of the dielectric film is preferably 10.0 μm or less, and more preferably 5.0 μm or less.

In the present embodiment, a method different from the above may be used to prevent reduction of the effective capacitance. Specifically, the structure of the columnar crystals may be controlled to prevent reduction of the effective capacitance.

In the present embodiment, within a distance range from one tenth to one third (both inclusive) of the thickness of the dielectric film from one electrode to the other electrode in the lamination direction of the dielectric device, the columnar crystals have an average width of less than 40 nm, preferably 30 nm or less, and more preferably 25 nm or less.

Within a distance range from one tenth to one third (both inclusive) of the thickness of the dielectric film from the other electrode to the one electrode, the columnar crystals have an average width of 40 nm or more, and preferably 45 nm or more.

That is, the length of the columnar crystals in the direction D2 orthogonal to the lamination direction D1 (the width of the columnar crystals) changes along the lamination direction D1. In FIG. 2, the columnar crystals are narrower at the first electrode 10 side and broader at the second electrode 20 side. Controlling the structure of the columnar crystals as described above can reduce the rate of change of capacitance at the time of application of the DC bias voltage.

The average width of the columnar crystals can be calculated as follows. First, as shown in FIG. 2, a straight line L1 parallel to the direction D2 orthogonal to the lamination direction D1 is drawn at a height determined within the distance range from one tenth to one third (both inclusive) of the thickness of the dielectric film from the one electrode in the lamination direction D1. Likewise, a straight line L2 parallel to the direction D2 orthogonal to the lamination direction D1 is drawn at a height determined within the distance range from one tenth to one third (both inclusive) of the thickness of the dielectric film from the other electrode. Next, a predetermined length L1a and a predetermined length L2a each having its ends at grain boundaries are determined on the straight lines L1 and L2 respectively. Then, the number of grain boundaries of the columnar crystals included in each of the predetermined lengths L1a and L2a is counted. Dividing the predetermined lengths L1a and L2a by the corresponding number of the columnar crystals sandwiched between the grain boundaries can give the respective average widths of the columnar crystals.

In this case, the thickness of the dielectric film 30 is preferably 0.1 µm or more and 10 µm or less, and more preferably 0.2 µm or more and 5.0 µm or less.

The thickness of the dielectric film 30 can be measured by processing the thin film capacitor including the dielectric film 30 with a focused ion beam (FIB) processing machine and observing a given cross section with a scanning electron microscope (SEM), a transmission electron microscope (TEM), or the like.

The dielectric material of the dielectric film preferably includes a complex oxide having a perovskite structure represented by a chemical formula $ABO_3$ as a main component to enable larger capacitance. In the present embodiment, the main component preferably occupies 80 mol % or more and 100 mol % or less of the dielectric film as a whole (100 mol %). The columnar crystals preferably include the above-mentioned complex oxide as a main component.

In the chemical formula, "A" preferably includes at least one selected from the group consisting of barium (Ba), calcium (Ca), strontium (Sr), and lead (Pb), and "B" preferably includes at least one selected from the group consisting of titanium (Ti), zirconium (Zr), tin (Sn), and hafnium (Hf).

The dielectric film may include a subcomponent in addition to the main component ($ABO_3$). The subcomponent may be any component typically included in the dielectric material having the perovskite structure. In the present embodiment, examples of the subcomponent include magnesium (Mg), manganese (Mn), vanadium (V), yttrium (Y), and gadolinium (Gd). The amount of the subcomponent is a known amount.

As shown in FIG. 2, the dielectric film 30 may include a pore region 32 containing fine pores. The pore region 32 is where the fine pores are collectively formed. Because the pore region 32 is where the pores including no dielectric material are formed, the pore region 32 has a seemingly lower permittivity than a region where the columnar crystals 31 are formed. Thus, although the pore region 32 included in the dielectric film 30 slightly reduces the capacitance of the dielectric film, the pore region 32 can mitigate the DC bias dependence of the capacitance.

In the present embodiment, the pore region 32 is layered along the direction D2 orthogonal to the lamination direction D1. The pore region 32 is preferably formed between the columnar crystals 31 and at least one of the first electrode and the second electrode, and is more preferably formed between the columnar crystals 31 and either the first electrode 10 or the second electrode 20. In FIG. 2, the pore region 32 is formed between the first electrode 10 and the columnar crystals 31.

The pore region 32 preferably occupies 5% or more and 50% or less of the dielectric film 30, and more preferably occupies 5% or more and 30% or less of the dielectric film 30. The proportion of the pore region 32 can be calculated as, for example, the proportion of the area of the pore region in a cross section of the dielectric device along the lamination direction. The pore region 32 can be identified by, for example, splitting the dielectric film 30 into layers in planes parallel to the direction D2 orthogonal to the lamination direction D1 and checking whether the pores occupy a predetermined proportion (e.g., 5%) or more in these layers.

1.3 First Electrode

As shown in FIG. 1, the dielectric film 30 is sandwiched between the first electrode 10 and the second electrode 20 (described later). This indicates that the first electrode 10 is an electrode for enabling the capacitor to function. The first electrode 10 may include any conductive material that can endure heating and other treatments of the dielectric film. Examples of the material of the first electrode 10 include metals, such as gold (Au), platinum (Pt), silver (Ag), iridium (Ir), ruthenium (Ru), cobalt (Co), nickel (Ni), iron (Fe), copper (Cu), and aluminium (Al), or their alloys; semiconductors, such as silicon (Si), GaAs, GaP, InP, and SiC; and conductive metal oxides, such as ITO, ZnO, and $SnO_2$.

In the present embodiment, the first electrode doubles as a substrate on which the dielectric film is formed, and preferably has, for example, a plate-like shape (foil-like shape). In this case, the thin film capacitor can be further thinned and can easily be mounted on an electronic circuit substrate.

The first electrode has any thickness that enables the first electrode to function as an electrode. In the present embodiment, the thickness is preferably 0.01 µm or more. When the first electrode doubles as the substrate, the thickness is preferably 5 µm or more and 100 µm or less, and more preferably 10 µm or more and 50 µm or less. If the thickness of the first electrode is too thin, handling of the first electrode at the time of manufacturing the thin film capacitor 1 tends to be difficult.

1.4 Second Electrode

As shown in FIG. 1, the second electrode 20 is thinly formed as the upper electrode on a surface of the dielectric film 30. The dielectric film 30 is sandwiched between the second electrode 20 and the above-mentioned first electrode 10. This indicates that the second electrode 20 is also an electrode for enabling the capacitor to function. Thus, the second electrode 20 and the first electrode 10 have different polarities.

Similarly to the first electrode, the second electrode may include any conductive material that can endure heating and other treatments of the dielectric film. Examples of the material of the second electrode include metals, such as gold (Au), platinum (Pt), silver (Ag), iridium (Ir), ruthenium (Ru), cobalt (Co), nickel (Ni), iron (Fe), copper (Cu), and aluminium (Al), or their alloys; semiconductors, such as silicon (Si), GaAs, GaP, InP, and SiC; and conductive metal oxides, such as ITO, ZnO, and $SnO_2$.

Similarly to the first electrode, the second electrode has any thickness that enables the second electrode to function as an electrode. In the present embodiment, the thickness is preferably 0.01 µm or more.

2. Method of Manufacturing Thin Film Capacitor

Next, a method of manufacturing the thin film capacitor 1 shown in FIG. 1 will be explained below.

First, the first electrode 10 is prepared. In the present embodiment, a plate (foil) including the above-mentioned material is prepared as the first electrode 10. Because the dielectric film and the second electrode are to be formed on the foil, the foil is the lower electrode and doubles as the substrate.

Next, the material of the dielectric film is deposited on the first electrode 10 to form the dielectric film 30. In the present embodiment, a known film formation method is used to form the dielectric film 30 as follows. A dielectric film that is thinner than an intended thickness is formed first (partial dielectric film formation step), and then is heated to accelerate its crystallization (heating step). The partial dielectric film formation step and the heating step are repeated for a predetermined number of times to form the dielectric film 30 having the intended thickness on the first electrode 10.

Repeating the partial dielectric film formation step and the heating step for the predetermined number of times to form the dielectric film makes it easier for the average crystallite size of the dielectric film and the reciprocal of the thickness of the dielectric film to stay within the range shown in FIG. 3. Also, the width of the columnar crystals tends to be broader at one electrode side (the second electrode side) and narrower at the other electrode side (the first electrode side).

By performing the partial dielectric film formation step once, about one tenth to one half of the thickness of the dielectric film 30 is formed. In other words, the dielectric film is entirely formed by performing the partial dielectric film formation step two to ten times.

Examples of the known film formation method include a vacuum deposition method, a sputtering method, a pulsed laser deposition (PLD) method, a metal organic chemical vapor deposition (MO-CVD) method, a metal organic decomposition (MOD) method, a sol-gel method, and a chemical solution deposition (CSD) method. In the present embodiment, the sputtering method is preferable in terms of costs, etc.

Raw materials (e.g., vapor deposition materials, various target materials, organometallic materials) used during film formation may include a trace amount of impurities, sub-components, or the like. This is not a problem as long as desired dielectric properties are to be exhibited.

For example, when the sputtering method is used, the dielectric film having a predetermined thickness is formed on the first electrode doubling as the substrate using a target for forming the dielectric film. As for the film formation conditions in the partial dielectric film formation step, the substrate temperature is preferably 200 to 600° C.; the heating rate is preferably 15 to 30° C./min; the atmosphere during film formation is preferably argon (Ar), oxygen ($O_2$), or so; and the pressure during film formation is preferably 0.1 to 2.0 Pa. Controlling the film formation conditions within the above-mentioned ranges enables the columnar crystals to be readily generated as intended. Controlling the substrate temperature enables the proportion of the pore region to be controlled. For example, lowering the substrate temperature within the above-mentioned range increases the proportion of the pore region. After the partial dielectric film formation step, the ambient temperature is reduced to room temperature. The cooling rate is preferably 10 to 30° C./min.

When the sputtering method is used, as for the heating conditions during the heating step, the atmosphere is nitrogen ($N_2$), hydrogen ($H_2$) or the like; the heating rate is preferably 5 to 20° C./min; the highest temperature is 400 to 1200° C.; and the holding time at the highest temperature is 0.5 to 4 hours. After the heating step, the ambient temperature is reduced to room temperature. The cooling rate is preferably 5 to 10° C./min.

Next, a thin film including the material of the second electrode is formed on the dielectric film 30 by a known film formation method to form the second electrode 20.

This process gives the thin film capacitor 1 having the first electrode 10, the dielectric film 30, and the second electrode 20 formed in this order as shown in FIG. 1.

Hereinbefore, the embodiment of the present invention is explained, but the present invention is not to be limited thereto, and may be modified variously within the scope of the present invention.

EXAMPLES

Hereinafter, the present invention will be explained in further details with examples. However, the present invention is not to be limited to the examples described below.

Experiment 1

As a sputtering target necessary for forming a dielectric film, a sintered body of barium titanate ($BaTiO_3$) prepared by synthesizing barium carbonate ($BaCO_3$) and titanium oxide ($TiO_2$) with a solid phase method was used.

Next, a piece of nickel foil having a thickness of 28 µm was prepared as a first electrode. The nickel foil was heated to reach 400° C. On the nickel foil maintained at 400° C., a dielectric film having a thickness of 150 nm was formed by a sputtering method with the sputtering target (a partial dielectric film formation step for the first time). As for the film formation conditions, the atmosphere was argon (Ar), the heating rate was 20° C./min, and the pressure was 0.4 Pa. The dielectric film having a thickness of 150 nm was cooled at a cooling rate of 20 to 30° C./min to reach room temperature.

Next, the dielectric film formed on the first electrode was heated to reach 550° C. and was held for one hour (a heating step for the first time). As for the heating conditions, the atmosphere was nitrogen ($N_2$)+hydrogen ($H_2$) (concentration: 0.3%), and the heating rate was 10° C./min. The dielectric film after heating was cooled to reach room temperature.

The partial dielectric film formation step and the heating step were repeated for three more times so that the dielectric film had a thickness of 600 nm.

On the dielectric film having a thickness of 600 nm, a nickel (Ni) thin film was formed by the sputtering method as a second electrode to give thin film capacitor samples (Sample No. 1-1) having the structure shown in FIG. 1.

Thin film capacitor samples of Sample Nos. 1-2, 1a, and 1b were manufactured as in Sample No. 1-1, except that the heating temperature was as shown in Table 1.

Thin film capacitor samples of Sample Nos. 2-1, 2-2, 2a, and 2b were manufactured as in Sample Nos. 1-1, 1-2, 1a, and 1b, except that a dielectric film having a thickness of 300 nm, instead of 150 nm, was formed in the partial dielectric film formation step, and the heating temperature was as shown in Table 1.

Similarly, thin film capacitor samples of Sample Nos. 3-1, 3-2, 3a, and 3b were manufactured as in Sample Nos. 1-1, 1-2, 1a, and 1b, except that a dielectric film having a thickness of 600 nm, instead of 150 nm, was formed in the partial dielectric film formation step, and the heating temperature was as shown in Table 1. Similarly, thin film capacitor samples of Sample Nos. 4-1, 4-2, 4a, and 4b were manufactured as in Sample Nos. 1-1, 1-2, 1a, and 1b, except that a dielectric film having a thickness of 1200 nm, instead of 150 nm, was formed in the partial dielectric film formation step, and the heating temperature was as shown in Table 1.

The thickness of the dielectric film, which was measured by processing each thin film capacitor sample with a focused ion beam (FIB) and observing a given cross section with a scanning electron microscope (SEM), was as shown in Table 1.

Each thin film capacitor sample was evaluated as follows.

Crystallite Size

The thin film capacitor sample was cut along a plane parallel to the lamination direction. The exposed cross Capacitance and Rate of Change of Capacitance An AC voltage with a frequency of 1 kHz and an input signal level (measurement voltage) of 1 Vrms was applied to the thin film capacitor sample using a digital LCR meter (E4980A manufactured by Keysight) under application of a DC bias voltage at a reference temperature of 25° C. to measure the capacitance ("C"). The measured capacitance was divided by the area ("A") of the second electrode to calculate the capacitance per unit area ("C/A"). The applied DC bias voltage was 0 V, 1 V, 5 V, 10 V, and 20 V. Table 1 shows the results.

The rate of change of the capacitance per unit area (C/A) was calculated with respect to the benchmark (100%) value of C/A at the time when the applied DC bias voltage was 0 V, namely when no DC bias voltage was applied. Table 1 shows the results.

TABLE 1

| | Physical properties of dielectric device | | Film formation | Dielectric device evaluation | | | | | | | | | |
|---|---|---|---|---|---|---|---|---|---|---|---|---|---|
| | Dielectric film | | | DC bias 0 V | | DC bias 1 V | | DC bias 5 V | | DC bias 10 V | | DC bias 20 V | |
| Sample No. | Thickness (μm) | Crystallite size (nm) | condition Heating temperature (° C.) | Capacitance C/A (μF/cm²) | Change rate δC (%) | Capacitance C/A (μF/cm²) | Change rate δC (%) | Capacitance C/A (μF/cm²) | Change rate δC (%) | Capacitance C/A (μF/cm²) | Change rate δC (%) | Capacitance C/A (μF/cm²) | Change rate δC (%) |
| 1a | 0.6 | 11 | 400 | 0.121 | 100% | 0.121 | 100% | 0.121 | 100% | 0.122 | 101% | 0.119 | 98% |
| 1-1 | 0.6 | 18.8 | 350 | 0.243 | 100% | 0.243 | 100% | 0.244 | 101% | 0.243 | 99% | 0.220 | 92% |
| 1-2 | 0.6 | 22.4 | 800 | 0.404 | 100% | 0.408 | 101% | 0.400 | 99% | 0.392 | 97% | 0.368 | 91% |
| 1b | 0.6 | 30 | 900 | 1.272 | 100% | 1.374 | 108% | 0.712 | 56% | 0.433 | 34% | 0.267 | 21% |
| 22a | 1.2 | 10.5 | 400 | 0.070 | 100% | 0.122 | 101% | 0.123 | 102% | 0.123 | 102% | 0.122 | 100% |
| 2-1 | 1.2 | 16 | 550 | 0.133 | 100% | 0.133 | 100% | 0.134 | 101% | 0.136 | 102% | 0.134 | 101% |
| 2-2 | 1.2 | 18.3 | 600 | 0.155 | 100% | 0.157 | 101% | 0.153 | 99% | 0.150 | 97% | 0.144 | 93% |
| 2b | 1.2 | 22.8 | 900 | 0.649 | 100% | 0.662 | 102% | 0.610 | 94% | 0.519 | 80% | 0.641 | 71% |
| 3a | 2.4 | 4.9 | 400 | 0.030 | 100% | 0.030 | 100% | 0.030 | 101% | 0.031 | 102% | 0.031 | 102% |
| 3-1 | 2.4 | 10.8 | 550 | 0.067 | 100% | 0.067 | 100% | 0.067 | 101% | 0.068 | 101% | 0.068 | 102% |
| 3-2 | 2.4 | 15.4 | 600 | 0.091 | 100% | 0.091 | 100% | 0.092 | 101% | 0.091 | 100% | 0.087 | 96% |
| 3b | 2.4 | 23.5 | 900 | 0.345 | 100% | 0.348 | 101% | 0.339 | 104% | 0.338 | 98% | 0.273 | 79% |
| 4a | 4.8 | 3.5 | 400 | 0.015 | 100% | 0.015 | 100% | 0.015 | 100% | 0.015 | 100% | 0.015 | 101% |
| 4-1 | 4.8 | 8.9 | 505 | 0.037 | 100% | 0.037 | 100% | 0.037 | 100% | 0.037 | 101% | 0.037 | 101% |
| 4-2 | 4.8 | 11.2 | 600 | 0.045 | 100% | 0.045 | 101% | 0.045 | 99% | 0.044 | 97% | 0.042 | 93% |
| 4b | 4.8 | 20.1 | 900 | 0.180 | 100% | 0.180 | 100% | 0.182 | 101% | 0.169 | 94% | 0.149 | 83% | section of the dielectric film was subjected to XRD measurement with an XRD measurement device (Empyrean manufactured by Malvern Panalytical) to generate an X-ray diffraction chart. In the X-ray diffraction chart, a diffraction peak of (001) plane of a complex oxide ($BaTiO_3$) having a perovskite structure was identified as a clearly observed diffraction peak. From the diffraction angle (2θ) of the identified diffraction peak, the Bragg angle (θ) was calculated. Full width at half maximum (FWHM) (B) was also calculated by fitting using a Gaussian function for the diffraction peak of (001) plane. The calculated Bragg angle and FWHM were substituted in the following Scherrer equation to calculate the average crystallite size D (nm).

$$D = K\lambda/B \cos\theta$$

In the equation, K is the Scherrer constant (0.94 in the present examples), and λ is the wavelength (nm) of the X-ray.

As for the XRD measurement conditions, Cu-Kα1 (wavelength: 1.54060 Å) was used as the X-ray source, the tube voltage was 45 kV, the tube current was 40 mA, and 2θ was within a range of 15 to 85°. Table 1 shows the results. The relation between the average crystallite size and the reciprocal of the thickness of the dielectric film and is plotted in FIG. 3.

According to Table 1 and FIG. 3, it was confirmed that, when the thickness and the crystallite size of the dielectric film were within the hatched range shown in FIG. 3, the dielectric device had large capacitance and a small rate of change of capacitance at the time of application of a DC bias voltage.

Experiment 2

Thin film capacitor samples of Sample No. 5 were manufactured as in Sample No. 1-1, except that a sintered body of $(Ba,Ca,Sr)(Ti,Zr)O_3$ was used as a sputtering target, and a dielectric film having a thickness of 100 nm, instead of 150 nm, was formed in the partial dielectric film formation step. Thin film capacitor samples of Sample No. 6 were manufactured as in Sample No. 1-1, except that the sintered body of $(Ba,Ca,Sr)(Ti,Zr)O_3$ was used as the sputtering target, and a dielectric film having a thickness of 25 nm, instead of 150 nm, was formed in the partial dielectric film formation step. The thin film capacitor samples of Sample Nos. 5 and 6 were evaluated as in Experiment 1. Table 2 and FIG. 3 show the results. The ratio of Ba, Sr, and Ca was Ba:Sr:Ca=0.90:0.05:0.05. The ratio of Ti to Zr was Ti:Zr=0.1:0.9.

TABLE 2

| | Physical properties of dielectric device | | Film formation | Dielectric device evaluation | | | | | | | | | |
|---|---|---|---|---|---|---|---|---|---|---|---|---|---|
| | Dielectric film | | | DC bias 0 V | | DC bias 1 V | | DC bias 5 V | | DC bias 10 V | | DC bias 20 V | |
| Sample No. | Thickness (μm) | Crystallite size (nm) | condition Heating temperature (° C.) | Capacitance C/A (μF/cm²) | Change rate δC (%) | Capacitance C/A (μF/cm²) | Change rate δC (%) | Capacitance C/A (μF/cm²) | Change rate δC (%) | Capacitance C/A (μF/cm²) | Change rate δC (%) | Capacitance C/A (μF/cm²) | Change rate δC (%) |
| 5 | 0.4 | 20.2 | 600 | 0.221 | 100% | 0.221 | 100% | 0.219 | 98% | 0.217 | 98% | 0.214 | 97% |
| 6 | 0.1 | 34.1 | 600 | 0.895 | 100% | 0.895 | 99% | 0.886 | 99% | 0.859 | 96% | 0.824 | 92% |

According to Table 2 and FIG. 3, it was confirmed that, even when the composition of the complex oxide included in the dielectric film was changed, the same results were produced as in Experiment 1.

Experiment 3

The thin film capacitor samples of Sample Nos. 2-1, 2a, and 2b were cut along a plane parallel to the lamination direction. The exposed cross section of the dielectric film was observed with a scanning transmission electron microscope (STEM) at a magnification of 100,000× to 1,000,000× to generate a STEM-HAADF image.

In the STEM-HAADF image, at a distance of about 300 nm from the first electrode in the lamination direction, a straight line was drawn in a direction crossing columnar crystals (a direction orthogonal to the lamination direction). Similarly, at a distance of about 200 nm from the second electrode in the lamination direction, a straight line was drawn in the direction crossing the columnar crystals (the direction orthogonal to the lamination direction).

Figure 4:
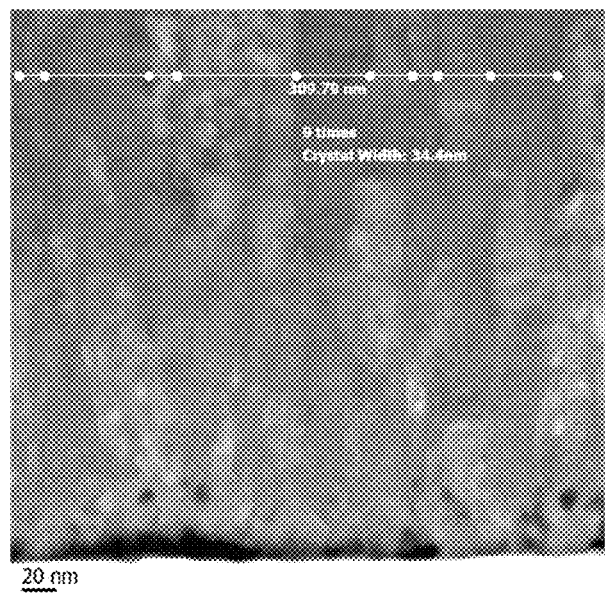
FIG. 4 is a set of electron microscope images in which the widths of columnar crystals of a sample according to an example are measured.
Figure 4:
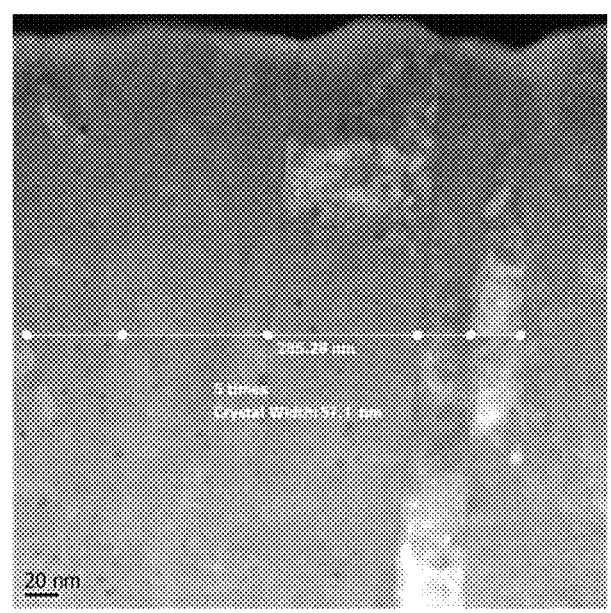

The number of grain boundaries included in a certain length having its ends at grain boundaries on each straight line is counted. The certain length is divided by the number of the columnar crystals sandwiched between the grain boundaries to calculate the average width of the columnar crystals. Table 3 shows the results. FIG. 4 is a set of STEM-HAADF images in which the average width of the columnar crystals is calculated at the first electrode side and at the second electrode side. White dots on the white lines in FIG. 4 indicate grain boundaries.

TABLE 3

| | Physical properties of dielectric device Dielectric film | | Film formation | Dielectric device evaluation | | | | | | | | | |
|---|---|---|---|---|---|---|---|---|---|---|---|---|---|
| | Crystal grain width | | | DC bias 0 V | | DC bias 1 V | | DC bias 5 V | | DC bias 10 V | | DC bias 20 V | |
| Sample No. | First electrode side (nm) | Second electrode side (nm) | condition Heating temperature (° C.) | Capacitance C/A (μF/cm²) | Change rate δC (%) | Capacitance C/A (μF/cm²) | Change rate δC (%) | Capacitance C/A (μF/cm²) | Change rate δC (%) | Capacitance C/A (μF/cm²) | Change rate δC (%) | Capacitance C/A (μF/cm²) | Change rate δC (%) |
| 2a | 31.9 | 33.5 | 400 | 0.070 | 100% | 0.122 | 101% | 0.123 | 102% | 0.123 | 102% | 0.122 | 100% |
| 2-1 | 34.4 | 51.7 | 600 | 0.133 | 100% | 0.133 | 100% | 0.134 | 101% | 0.136 | 102% | 0.134 | 101% |
| 2b | 43.5 | 50.1 | 900 | 0.649 | 100% | 0.662 | 102% | 0.610 | 94% | 0.519 | 80% | 0.461 | 71% |

According to Table 3, it was confirmed that, when the columnar crystals had a width of less than 40 nm at the first electrode side and a width of 40 nm or more at the second electrode side, the dielectric device had large capacitance and a small rate of change of capacitance at the time of application of a DC bias voltage.

Experiment 4

Thin film capacitor samples of Sample No. 1-3 were manufactured as in Sample No. 1-2, except that the substrate (nickel foil) had a temperature shown in Table 1 in the partial dielectric film formation step. The thin film capacitor samples of Sample No. 1-3 were evaluated as in Experiment 1. Table 4 shows the results.

TABLE 4

| | Film formation condition | | DC bias 0 V | | DC bias 1 V | | DC bias 5 V | | DC bias 10 V | | DC bias 20 V | |
|---|---|---|---|---|---|---|---|---|---|---|---|---|
| Sample No. | Substrate temperature (°C.) | Pore region Availability | Capacitance C/A ($\mu F/cm^2$) | Change rate δC (%) | Capacitance C/A ($\mu F/cm^2$) | Change rate δC (%) | Capacitance C/A ($\mu F/cm^2$) | Change rate δC (%) | Capacitance C/A ($\mu F/cm^2$) | Change rate δC (%) | Capacitance C/A ($\mu F/cm^2$) | Change rate δC (%) |
| 1-2 | 400 | Formed | 0.404 | 100% | 0.408 | 101% | 0.400 | 99% | 0.392 | 97% | 0.368 | 91% |
| 1-3 | 550 | Not formed | 0.45 | 100% | 0.45 | 100% | 0.441 | 98% | 0.428 | 95% | 0.392 | 87% |

According to Table 4, it was confirmed that formation of a pore region in the dielectric film slightly mitigated the DC bias dependence of the dielectric device.

INDUSTRIAL APPLICABILITY

Having the above-mentioned structure, the dielectric device according to the present invention has a small rate of change of capacitance at the time of application of a DC bias voltage. Thus, such a dielectric device is suitable as, for example, a thin film capacitor to be mounted on an electronic circuit.

NUMERICAL REFERENCES

1 . . . thin film capacitor
10 . . . first electrode
30 . . . dielectric film
31 . . . columnar crystal
32 . . . pore region
20 . . . second electrode

What is claimed is:

1. A dielectric device comprising:
a first electrode;
a dielectric film; and
a second electrode, wherein
the first electrode, the dielectric film, and the second electrode are laminated;
the dielectric film includes columnar crystals extending in a direction of lamination; and
"x" and "y" are located on straight lines connecting point A (0.10, 5), point B (10, 20), point C (10, 35), and point D (0.10, 10) in this order and within a region boxed by the straight lines on an (x, y) plane, provided that "x" denotes a reciprocal (1/$\mu$m) of a thickness of the dielectric film and "y" denotes an average crystallite size (nm) of a dielectric material of the dielectric film calculated by the Scherrer equation.

2. The dielectric device according to claim 1, wherein the dielectric film comprises a complex oxide having a perovskite structure represented by a chemical formula $ABO_3$;
"A" in the chemical formula comprises at least one selected from the group consisting of barium, calcium, strontium, and lead; and
"B" in the chemical formula comprises at least one selected from the group consisting of titanium, zirconium, tin, and hafnium.

3. The dielectric device according to claim 1, wherein the dielectric film comprises a pore region including a fine pore between the columnar crystals and at least one of the first electrode and the second electrode.

4. A dielectric device comprising:
a first electrode;
a dielectric film; and
a second electrode, wherein
the first electrode, the dielectric film, and the second electrode are laminated;
the dielectric film includes columnar crystals extending in a direction of lamination; and
the columnar crystals have an average width of less than 40 nm within a distance range from one tenth to one third (both inclusive) of a thickness of the dielectric film from one electrode to the other electrode of the first and second electrodes in the direction of lamination, and an average width of 40 nm or more within a distance range from one tenth to one third (both inclusive) of the thickness of the dielectric film from the other electrode to the one electrode in the direction of lamination.

5. The dielectric device according to claim 4, wherein the dielectric film has a thickness of 0.1 $\mu$m or more and 10 $\mu$m or less.

6. The dielectric device according to claim 4, wherein the dielectric film comprises a complex oxide having a perovskite structure represented by a chemical formula $ABO_3$;
"A" in the chemical formula comprises at least one selected from the group consisting of barium, calcium, strontium, and lead; and
"B" in the chemical formula comprises at least one selected from the group consisting of titanium, zirconium, tin, and hafnium.

7. The dielectric device according to claim 4, wherein the dielectric film comprises a pore region including a fine pore between the columnar crystals and at least one of the first electrode and the second electrode.

* * * * *